Sept. 18, 1934. C. E. LUCKE ET AL 1,973,721
STEAM TEMPERATURE REGULATOR
Filed June 18, 1930
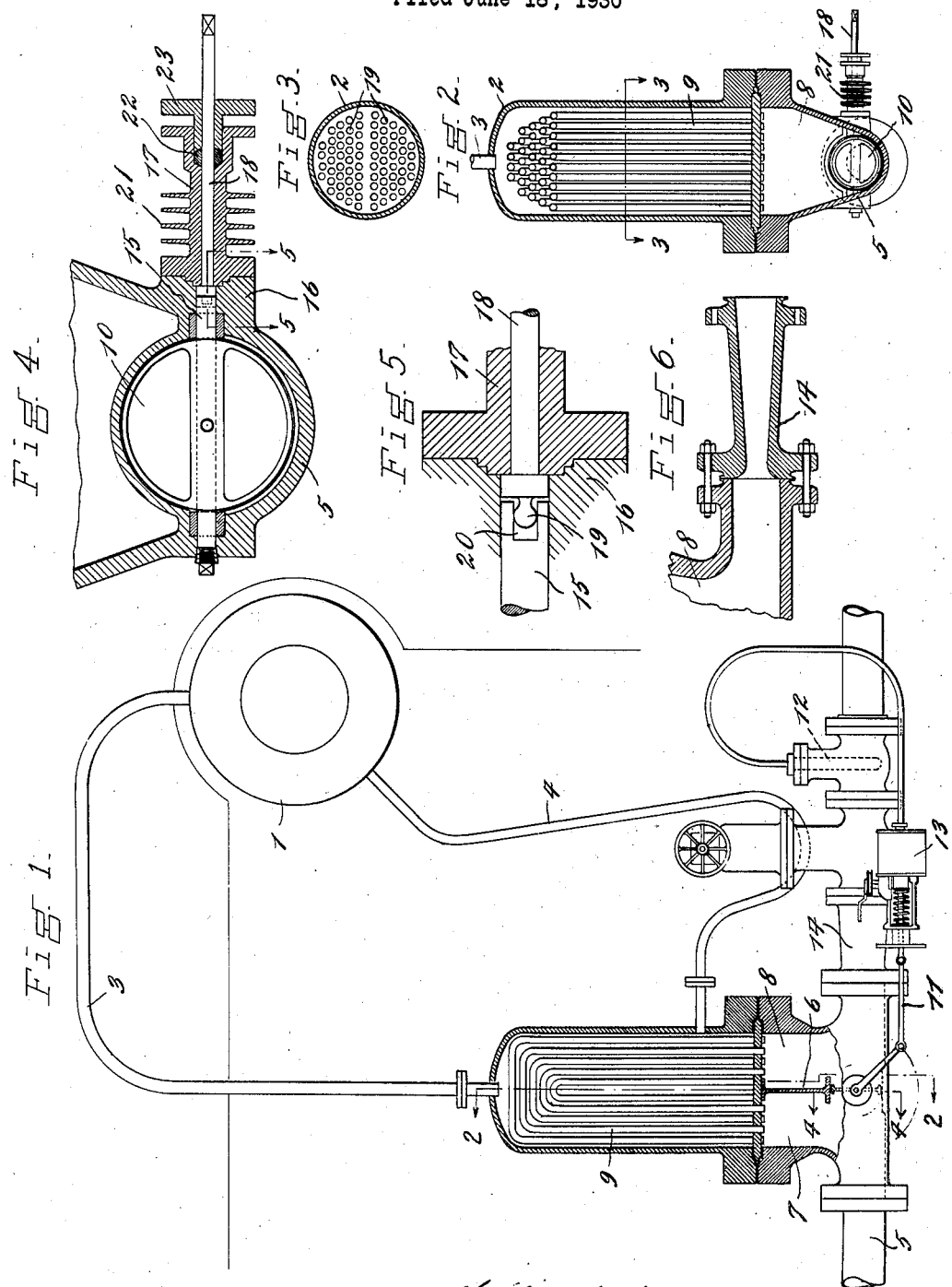
Charles E. Lucke
John C. Black
INVENTORS
BY
Gifford, Scull & Burgess
ATTORNEYS.

Patented Sept. 18, 1934

1,973,721

UNITED STATES PATENT OFFICE 1,973,721

STEAM TEMPERATURE REGULATOR

Charles E. Lucke, New York, N. Y., and John E. Black, Rumson, N. J., assignors to The Babcock & Wilcox Company, Bayonne, N. J., a corporation of New Jersey Application June 18, 1930, Serial No. 461,861

4 Claims. (Cl. 122—479)

This invention relates to a novel and improved regulator for use in modifying the temperature of steam, and the novel features will be best understood from the following description and the annexed drawing, in which Fig. 1 is a diagrammatic view showing our invention connected to a boiler.

Fig. 2 is a section on the line 2—2 of Fig. 1.

Fig. 3 is a section on the line 3—3 of Fig. 2.

Fig. 4 is a section on the line 4—4 of Fig. 1.

Fig. 5 is a section on the line 5—5 of Fig. 4.

Fig. 6 is a longitudinal section through the Venturi tube shown in Fig. 1.

Referring now to Fig. 1, we have shown the invention as used in connection with a boiler having a steam and water drum 1, this drum having the usual water and steam spaces. Connected to the steam and water spaces is a regulator 2 having a chamber therein, from the upper part of which leads a connection 3 to the steam space of the drum, and from the lower part of which leads a connection 4 to the water space of the drum.

The regulator is used to control the temperature of steam flowing in a steam pipe 5, this pipe usually carrying steam from the same boiler as the one on which the drum 1 belongs, although obviously the invention may be used where the steam supply is from other boilers. Usually, the steam is superheated, and the regulator is employed to maintain a uniform superheat. This is done by maintaining a continuous supply of fluid in the chamber of the regulator, this fluid being at a different temperature than that of the steam and, in this embodiment, being at a lower temperature, so that it forms a heat-absorbing medium.

The regulator is shown as being connected to the steam pipe by a T-connection having a diaphragm 6 separating an inlet 7 from an outlet 8. Connected to the inlet and outlet is a plurality of tubes 9, here shown as having parallel legs connected by return bends. By this arrangement, it will be seen that the steam will flow from the pipe 5 through the inlet 7, tubes 9, and back through the outlet 8 to the steam pipe, and that this steam while passing through the tubes will be in heat conducting relationship with the medium in the regulator, this medium being in this instance water from the boiler.

In order to vary the temperature of the steam in the pipe beyond the regulator, we provide in the diaphragm 6 a valve, here shown as a butterfly valve 10, whereby some of the steam may by-pass the regulator. This valve is operated by suitable connections 11 from a thermostat 12 in the steam pipe beyond the regulator, in the form shown this thermostat transmitting pressure through a device 13 to the connections 11. By this arrangement, the temperature of the steam in the pipe passing the thermostat 12 will automatically control the valve 10, so as to by-pass a greater or less amount of the steam past the regulator. The steam which passes through the regulator will, of course, have its temperature decreased, and will then mix with the steam which is by-passed through the valve 10, thereby decreasing the temperature of that steam and achieving the desired net temperature for the entire mixture. In order to insure thorough mixing of the two streams of steam between the regulator and the thermostat, we provide a Venturi tube 14 which exemplifies a suitable means for causing the desired thorough mixture.

Referring now to Figs. 4 and 5, it will be seen that where the stem 15 of the valve passes through the casing of the T-connection, it has a bearing in the casing which is enlarged and extended along the stem, as indicated at 16, to aid in conducting heat away from the stem. If desired, an additional piece 17 may be secured to the casing to provide a bearing for an extension 18 of the stem, this extension being joined to the stem in any suitable way, for example, by having a head 19 received in a recess 20 of the stem 15. The extension 17 may be provided with cooling fins 21 which, with the other heat absorbing parts of the casing, will cause condensation of any steam which leaks along the stem before it reaches the packing 22, which is held in place by the stuffing box 23. This will provide smoother working of the valve than if the packing were subjected to the live steam, which would result in binding due to the consequent swelling of the packing.

In operation, steam passes through the pipe 5, and some of it passes through the regulator 2, where it gives up heat to the water which in this case forms a heat-absorbing medium. As noted above, this medium is continuously supplied from the boiler. More or less of the steam is by-passed around the regulator through the valve 10, this being operated by the thermostat 12 so that the temperature of the steam in the pipe beyond the regulator at the thermostat may be maintained substantially constant. The tubes 9, of course, exemplify passages which are in thermal contact with the heat-absorbing medium, and these passages are disposed in a relationship to the steam pipe which may be called "in parallel". The word "parallel" here is not used as a geometrical term but in the same sense as employed in electrical circuits.

We claim:—

1. In combination, a steam pipe and a temperature regulator having one or more passages arranged in parallel with said pipe whereby steam may flow through the pipe or the regulator or both, means maintaining in the regulator a continuous supply of a heat-absorbing medium in thermal contact with said passages, means for controlling the amount of steam passing through the regulator, means to operate said controlling means by changes in the temperature of the steam in the pipe after it has passed the regulator, and a Venturi tube in the portion of pipe through which the steam flows after it has passed the regulator.

2. In fluid heat exchange apparatus, a main fluid supply line, a divider including a wall extending across the fluid flow in the line, a regulating valve comprising a part of the wall, a tubular heat exchanger having an inlet and outlet separated by the wall so that the fluid is caused to pass through the exchanger when the valve is closed, a chamber enclosing the exchanger, means for supplying a fluid at a different temperature to the chamber, and a controller responsive to temperature changes in the line beyond the wall for changing the position of the valve in accordance with those changes.

3. In apparatus for treating superheated steam so as to maintain a uniformity of superheat, a steam boiler including a steam and water drum, a desuperheater chamber connected near its top and bottom respectively with the steam and water spaces of the drum so that there is maintained in the chamber free circulation of boiler fluid, a by-pass chamber below the desuperheater chamber and divided by a wall into an inlet and an outlet, a superheated steam main leading to the inlet at a position below the desuperheater chamber, self draining conduits in the desuperheater chamber with their inlets and outlets communicating respectively with the above mentioned inlet and outlet, a valve in said wall positioned so as to permit a part of the superheated steam to proceed directly past the desuperheater chamber, a controller actuating the valve so as to cause a regulated part of the superheated steam to pass through the conduits while another part is proceeding past said chamber, an outlet main communicating with the outlet chamber so as to direct to a point of use steam reformed from the divided parts, and means in the outlet main for causing the valve to be actuated in accordance with the temperature of the steam in the reformed stream.

4. In apparatus for treating superheated steam so as to maintain a uniformity of superheat, a steam boiler including a steam and water drum, a desuperheater chamber separately connected with the steam and water spaces of the drum so that there is maintained in the chamber free circulation of boiler fluid, a by-pass chamber at a level below that of the desuperheater chamber and divided into an inlet and an outlet, a superheated steam main leading to the inlet at a position lower than the desuperheater chamber, self draining conduits in the desuperheater chamber with their inlets and outlets communicating respectively with the above mentioned inlet and outlet, a valve between the inlet and outlet positioned so as to permit a part of the superheated steam to proceed directly past the desuperheater chamber, a controller actuating the valve so as to cause a regulated part of the superheated steam to pass through the conduits while another part is proceeding past said chamber, an outlet main communicating with the outlet chamber so as to direct to a point of use steam reformed from the divided parts, and means in the outlet main for causing the valve to be actuated in accordance with the temperature of the steam in the reformed stream.

CHARLES E. LUCKE.
JOHN E. BLACK.